United States Patent Office.

EDWARD WESTERMAYR, OF CHICAGO, ILLINOIS.

*Letters Patent No.* 85,713, *dated January* 5, 1869; *reissue No.* 3,674, *dated October* 12, 1869.

IMPROVED COMPOSITION FOR ARTIFICIAL STONE.

The Schedule referred to in these Letters Patent and making part of the same.

*To all whom it may concern:*

Be it known that I, EDWARD WESTERMAYR, of Chicago, in the county of Cook, and State of Illinois, have invented a new and useful improved Composition for Artificial Stone, &c.; and I do hereby declare the following to be a full, clear, and exact description thereof, which will enable others skilled in the art to which my invention appertains, to make and use the same.

My invention consists in producing artificial stone, tiles, bricks, mouldings, &c., of any desired form or color, by mixing and compounding certain materials, and subjecting the mixture to certain novel processes, as hereinafter explained.

For the purpose of producing artificial stone, I take one (1) part of Portland or other suitable cement, one-half (½) part of clean sand, and one-half (½) part of slag, (cinder of iron,) and mix together in a dry state.

For the formation of bridge-piers which are located under water, I take one (1) part of any proper cement, one (1) part of sand, one (1) part of slag, and six (6) parts of fine or coarse gravel.

To these mixtures, separately, I add water alone, or water containing sulphate of iron or copperas, in solution, in sufficient quantity to make a stiff mortar, by thoroughly stirring up and mixing the mass.

I do not intend to confine myself to any specific proportions of the ingredients, as they may be varied indefinitely in the manufacture of various articles, without departing from my invention.

After the mortar has been made, I put it into moulds of any desired form, and subject it therein to pressure, by any suitable means, until compacted into a mass sufficiently firm, fixed, and solid to form artificial stone, tiles, bricks, mouldings, bridge-piers, &c.

The article so formed, I then place in a drying-room, and keep it there about two weeks, more or less, when I put it into a reservoir of clean water and allow it to remain about twenty-four hours, for the purpose of dissolving any particles of lime that may be adhering to or remaining in it, as well as for increasing its hardness.

After being removed from the water and allowed to dry, it will be found, in the course of four or five weeks, to possess all the hardness and durability of the best qualities of natural stone, and superior to it in many respects.

Any desired color may be given to the stone or other article, by mixing any suitable pigments with the mortar, as India-red, lamp-black, and other coloring materials.

In this way I am able to produce or manufacture an artificial stone or material, to be employed in different structures, of any desired form or color.

Having thus described my invention,

What I claim as new, and desire to secure by Letters Patent, is—

Artificial stone, of any desired form or color, composed of the ingredients, substantially as herein described.

EDW. WESTERMAYR.

Witnesses:

A. F. STEVENSON,

N. H. STEVENSON.